United States Patent Office 2,893,916
Patented July 7, 1959

2,893,916

IRON CONTAINING COMPOSITIONS

Martin Rubin, Silver Spring, Md.

No Drawing. Application May 28, 1956
Serial No. 587,499

7 Claims. (Cl. 167—68)

This invention relates to novel chemical compounds and particularly to a class of chemical compounds suitable for use in supplying the human body with a source of iron.

The human body customarily secures its iron needs by oral ingestion of iron containing materials. When an iron deficiency anemia is exhibited by a patient, physicians have many iron preparations suitable for oral administration available commercially, but few suitable for more direct administration such as intravenous or intramuscular injection. Yet for one reason or another many individuals are not capable of satisfying an iron deficiency by absorbing orally ingested iron into the blood stream.

The reason for the paucity of injectable iron supplying compositions lies in the multiplicity of hazardous effects which can be encountered, and each of which must be avoided before a composition can be considered suitable as a safe and effective injectable source of iron. Thus administration of soluble ionized iron salts into the blood stream results partly in precipitation of the blood proteins as iron combinations, partly in precipitation of the iron as an insoluble hydroxide or phosphate colloid, and partly in the diffusion of the ionic iron salts into the tissues. This combination of events results in series damage and possible death to the organism.

Decreasing the degree of ionic dissociation of the iron by forming more tightly associated iron complexes of an organic nature decreases the extent of the immediate and acute toxic manifestations of administration, e.g. precipitation of iron compounds in the blood stream. However, latent toxicity is still present as a consequence of the iron complex diffusing from the blood stream into the tissue cells. Diffusion brings the complexed iron into intimate contact with the cellular constituents where metabolism of the organic portion of the iron complex can occur. Destruction of the organic complexing agent results in intracellular deposition of the iron with serious poisoning effects. The iron ascorbic complex has found little application in the treatment of iron deficiency anemia because it is in the category of metabolizable iron compounds.

Use of a carrier which is not appreciably destroyed by the metabolism of the body cells obviates this difficulty and leads to better results. Thus the iron complexes of some poorly metabolized carbohydrates have found some favor with the medical profession and partly satisfy the needs for an intravenous iron preparation. The binding of iron by these compounds, notably the iron saccharate, is relatively weak. While the iron saccharate retains its identify in the blood and is delivered rapidly to the iron utilizing cells of the body, the compound does not withstand the conditions favoring iron dissociation that are present in the tissues. Accordingly iron saccharate should not be permitted to remain in the blood stream long enough to migrate from the blood stream into the tissues. Therefore, no more iron saccharate can be injected intravenously than will immediately be utilized. Should an excess be injected, the non-utilized portion diffuses into the tissues where the iron precipitates. To be safe, iron saccharate is injected in amounts well below bodily requirements of iron thereby minimizing the possibility of iron precipitation in the tissues. Thus even for intravenous injection, iron saccharate cannot be considered completely safe. Intramuscular injection is out of the question because iron precipitation with consequent discoloration and tissue degeneration occurs at the site of injection.

The reasoning outlined above suggested that a more tightly bound iron complex than the saccharate might be more advantageous as an intravenous iron source. This possibility was tested at the suggestion of the inventor in a study of the tightly bound iron ethylenediametetraacetate. As has been reported, this iron compound was found to be not useful as an iron source.[1]

In addition to the variables primarily relating to intravenous injection which have been outlined above, other considerations enter into the development of a suitable iron compound for administration by the intramuscular route. The iron binding strength of the compound must be great enough so that the iron is not detached at the site of injection either by local pH conditions or by precipitation through interaction with tissue proteins. A soluble iron complex meeting these requirements must also, however, release the iron at the places in the body where hematopoesis takes place.

A safe and effective iron composition meeting the above mentioned requirements and otherwise capable of intramuscular administration would be a boon to iron therapy. The comparative ease of intramuscular administration would encourage physicians to administer iron in borderline instances where iron is desirable but not sufficiently essential to warrant intravenous administration of potentially hazardous materials such as iron saccharate.

The prime object of this invention is to provide a novel class of iron complexes.

A further object of this invention is to provide medically useful iron compositions which are per se non toxic to the human system and which may be tolerated in relatively large amounts.

Still another object of this invention is to provide an iron containing medical preparation which can be administered intramuscularly.

Other objects and advantages will be apparent as the invention is more fully hereinafter disclosed.

The new compounds contemplated by this invention correspond stoichiometrically to the formula:

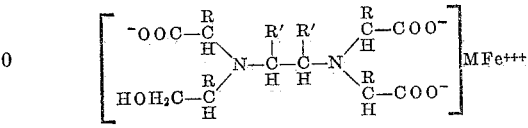

where each R is selected from the group consisting of hydrogen and methyl radicals. Each R' is selected from the group of radicals consisting of individual hydrogen and methyl radicals and together the residue of a 1,2 substituted diamino-cyclohexyl radical. M is a non-toxic cation. The iron is in the ferric state.

Ordinarily the M is a metal selected from the group consisting of sodium, potassium, calcium ($\frac{1}{2}$ Ca$^{++}$) and magnesium ($\frac{1}{2}$ Mg$^{++}$). However, non toxic organic bases may be used. Specifically dibenzyl amine, procaine, 1 phenyl-2 methyl amino propanol, 1-N-methyl 1,2 diphenyl-2-hydroxy ethyl amine, NN dibenzyl ethylene diamine, or NN bis (dihydro abietyl) ethylene diamine may also form the M.

According to the above formula an inconsistency would appear to exist by virtue of the three COO$^-$ radicals being balanced by four positive ions, the cation repre-

[1] Seeberg, V. P.; Hidalgo, J.; Wilkin, W.; Science, 119, p. 608 (1954).

sented by M, e.g. Na+ and the trivalent ferric, Fe+++. However, measurements indicate that the compound as a whole is electrically neutral. The M is held loosely enough for ionic disassociation from the rest of the compound in aqueous solution. On the other hand the iron is tightly chelated or complexed in the organic residue of the molecule. It appears from the data that the M, e.g. ½ Mg++ balances one of the COO− groups and the Fe+++ balances the other two COO− groups. Without being bound thereto, it is submitted as a speculation that the remaining + charge of the ferric iron is associated with an OH− or a HCO$_3$− group in a non-ionizing bond.

The feasibility of intramuscular administration of individual compounds falling within the above listed class lies primarily in two advantageous factors. One is the non toxicity of the iron complex at the intramuscular site of administration. These compounds hold the iron so tightly that there is no hydrolysis and precipitation in the tissues, thereby allowing the complex to migrate from the muscle tissues into the blood stream. Likewise the iron is too tightly held in the complex to react with any component of the blood stream which would precipitate the iron. The second factor is the substantially non-metabolizable nature of the organic portion of the complex. The complex, being nonmetabolizable in the tissue cells leaves no intracellular iron deposit behind as it passes into and out of tissue cells from the blood stream. The non-utilized iron complex eventually finds its way into the excretory channels of the body, specifically into the urinary excretion. Thus the iron is either utilized by the body or excreted.

The strength with which the complex holds the iron is of the same order of magnitude as the naturally occurring iron binding protein of the blood, siderophillin. Accordingly, the iron utilizing hematopoesis which forms the red blood cells can remove iron from the complex just as from siderophillin. Advantageously, this level of complexing strength permits the body to accept or not accept iron from the complex according to its needs. Inasmuch as the rejected portion is ultimately excreted, there is no hazard connected with an inadvertent overdose.

Frequently, however, non-acceptance of iron from the complex is momentary and acceptance would be more complete if a continuing concentration of the complex were maintained in the blood stream. The aforementioned organic bases, e.g. procaine, act to slow down excretory removal of the complex from the blood stream and thereby prolong the time for possible iron acceptance by the system. In this sense they are more advantageous than the metal cations.

Even removal of the iron from the complex for bodily utilization does not result in biochemical oxidation of the organic residue of the iron complex. Instead it is excreted through the urinary tract as the corresponding calcium compound (or chelate).

Specific examples of compounds within the above listed generic formula are as follows:

(1) *Sodium-iron beta hydroxy ethyl ethylene diamine triacetic acid.*—Beta hydroxyethyl ethylene diamine available from commercial sources may be converted to beta hydroxyethyl ethylene diamine tri-acetate by reaction with formaldehyde and hydrogen cyanide followed by acid hydrolysis as has been described in the literature. Alternately, the compound may be prepared from the same commercial starting material as has been described in the Journal of the American Chemical Society.[2]

To 140 gr. of this material partly dissolved in 500 ml. of water is added a freshly precipitated suspension of 150 gr. of ferric hydroxide in 500 ml. of water. (The ferric hydroxide may be conveniently prepared by the precipitation of a soluble ferric salt such as the chloride by the addition of excess sodium hydroxide solution followed by removal of the supernatant solution by centrifugation and re-suspension of the precipitate in distilled water.) To the mixed suspension of amino acid and iron hydroxide is added ten percent sodium hydroxide solution until the pH of the solution reaches 8.0. As the alkali is added, the amino acid and the major proportion of the iron hydroxide dissolve. Formation of the iron complex is indicated by the development of a deep red color in the solution. To complete the reaction, the mixture is heated at the boiling point for one hour. The pH of the solution must be adjusted by the addition of base so that it remains at 8.0. This process requires approximately 200 ml. of the solution of the base. Following this step the reaction mixture is cooled and carbon dioxide baffled into the solution until the pH is reduced to 7.4. The mixture is centrifuged to remove the insoluble matter. The clear red supernatant solution is then treated with acetone which results in the separation of two phases. The lower aqueous phase contains the red sodium iron complex. It is separated by any convenient process such as decantation of the supernatant acetone solution or by separation in a separating funnel. The addition to this concentrated solution of absolute ethanol, results in the precipitation of the solid amorphous product in a form suitable for further utilization. One important characteristic of this invention may be noted at this point. This solid amorphous product when dried, shows on analysis, the composition of the sodium ferric beta hydroxy ethyl ethylene diamine tri-acetate. In addition, analysis shows the presence of up to five percent of the iron free beta hydroxyethyl-ethylene diamine tri-acetate. The presence of this small quantity of this material confers particular stability on solutions that are prepared for injection purposes from this material. It is believed that this favorable result is brought about by inhibition of the precipitation of iron hydroxide which sometimes occurs due to hydrolysis of the iron complex.

To prepare the iron compound free of any organic compound uncombined with iron, the final product is extracted several times with 500 ml. portions of boiling 95% ethanol.

(2) The same procedure described in Example 1 is used to prepare, respectively, the corresponding magnesium, calcium and potassium salts of iron beta hydroxyethyl ethylene diamine tri-acetic acid.

(3) *The dibenzylamine salt of iron beta-hydroxyethyl ethylene diamine tri-acetic acid.*—To the same mixed suspension of amino acid and iron hydroxide as used in Example 1 is added an alcoholic solution of dibenzyl amine until the pH of the mixture reaches 7.4. While maintaining this pH, if necessary by the addition of added quantities of dibenzyl amine, the mixture is refluxed for two hours. At the end of the reflux period, the mixture is filtered and the product precipitated by the addition of absolute ethanol. The red amorphous material shows the correct analytic values for the desired product, namely dibenzyl amino ferric beta hydroxyethyl ethylene diamine tri-acetate.

(4) *Other base salts.*—The same procedure as in Example 3 prepares the procaine, 1 phenyl-2 methyl amino propanol, 1-N-methyl 1,2 diphenyl-2- hydroxy ethyl amine, N,N' dibenzyl ethylene diamine, and N,N bis (dihydro abietyl) ethylene diamine salts of iron beta hydroxy ethyl ethylene diamine triacetic acid.

(5) *Sodium iron complex of N beta hydroxy ethyl cyclohexyl 1,2 diamino N,N' tri-acetate.*—By reaction in the usual manner with one equivalent of ethyleneoxide, 1,2 diamino cyclohexane is converted to the N beta hydroxyethyl derivative. Further reaction with formaldehyde and hydrogen cyanide followed by hydrolysis with sulfuric acid yields the starting material—1,2 diamino-cyclohexane N-beta hydroxy ethyl N,N'-tri-acetate.

This compound treated as described above in Example 1 yields the desired sodium iron complex. Substitution

[2] Chaberek, S., and Martell, A., J. Am. Chem. Soc., 77, p. 1477 (1955).

of organic base for alkali as described above in Example 3 provides the corresponding organic base salts of the iron complex.

(6) *Sodium ferric complex of β-hydroxyethyl 1,2 propylene diamine N,N tri-acetic acid.*—Using 172 grams of β-hydroxyethyl 1,2 propylene N,N tri-acetic acid and following the procedure of Example 1 with the same quantities of ferric hydroxide and alkali as in Example 1, the sodium-ferric complex of β-hydroxyethyl 1,2 propylene diamine N,N tri-acetic acid is prepared. Similarly the corresponding magnesium, calcium and potassium ferric complexes are prepared by the same procedure as Example 1 (substituting MgOH, CaOH, and KOH solutions, respectively, for the NaOH solution).

Using the procedure outlined in Example 3, the procaine, dibenzyl amine, 1 phenyl-2 methyl amino propanol, 1-N-methyl 1,2 diphenyl-2-hydroxy ethyl amine, N,N dibenzyl ethylene diamine, and N,N bis (dihydro abietyl) ethylene diamine salts of ferric β-hydroxyethyl 1,2 propylene diamine N,N tri-acetic acid are prepared.

(7) By the interaction of acetaldehyde, sodium cyanide and ethylene diamine in sodium hydroxide solution, is prepared beta hydroxy propyl ethylene diamine. Conversion to the N,N tri-acetic acid salt is carried out by the method of Example 1.

The sodium ferric complex and the dibenzyl amine salt of the ferric complex are prepared according to the methods of Examples 1 and 3, respectively. Similarly the other metal salts and the other organic base salts of Examples 2, 4 are correspondingly prepared.

The novel iron compounds herein disclosed may be dissolved in pyrogen-free water, in isotonic saline solution or in glucose solutions. For the reasons given in the discussion of Example 1, the iron complex should contain from ½% to 5% thereof of the corresponding iron-free $M_3$ salt, e.g. the tri sodium salt.

As a practical matter, the amorphous reaction product precipitated by the ethanol generally contain about 2% of the iron-free salt. Actually, therefore, the amorphous reaction product is preferred over the corresponding purified iron compound for pharmaceutical purposes. It can be supplied in its initially dehydrated or dry form. Dissolved in pyrogen-free distilled water to a concentration of 15 mg. of iron per ml, the pH is about 7.4. Mild heating hastens solution. Alternatively a prepared solution (pH about 7.4) can be supplied. As previously pointed out, intramuscular administration is preferred, but in passing it should be noted that these compositions can also be administered intravenously.

While a range of concentrations of iron complex in injectable solution from about 5–20 mg. of iron per ml, is permissible, solutions which provide about 15 mg. of iron per ml. have been especially useful for therapy.

As an illustration of the efficacy of the preparations of the present invention to provide a rapid supply of iron for the restoration of hemoglobin levels in iron deficient animals, the following experiment may be cited. Weanling rats were maintained on a diet of powdered milk and iron-free water for a period of eight weeks. By this time their hemoglobin levels had decreased to 4 gr./100 ml. indicating a severe iron deficiency anemia. The animals were divided into two groups. One group was given 6 mg./kg./day of iron as the sodium ferric ethylene diamine beta hydroxy ethyl tri-acetate in water solution by tri weekly intramuscular injection. A second group of animals was given a corresponding dose of iron saccharate by the same route. The group of animals treated with the amino acid iron complex showed a prompt restoration of the hemoglobin levels to normal values. The group treated with iron saccharate failed to show any improvement in their low hemoglobin levels.

What is claimed is:

1. A composition comprising a ferric complex stoichiometrically corresponding to the formula

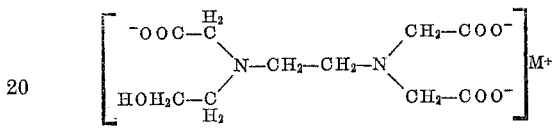

per mol of iron where $M^+$ is a non-toxic cation selected from the group consisting of Na, K, ½Mg, ½Ca, procaine, dibenzylamine, 1 phenyl-2 methyl amino propanol, 1-N-methyl 1,2 diphenyl-2-hydroxy ethyl amine, N,N dibenzyl ethylene diamine, and N,N bis (dihydro abietyl) ethylene diamine, said composition as a whole being about neutral electrically.

2. An about neutral medical preparation consisting of a pyrogen-free aqueous solution of the ferric complex of claim 1 and not more than 5% of the corresponding iron free tri-cation salt of the aminopoly carboxylic acid.

3. An about neutral medical preparation consisting of a pyrogen-free aqueous solution of the ferric complex of claim 1 and from 0.5 to 5% of the corresponding iron-free tri-cation salt of the aminopoly carboxylic acid.

4. An about neutral medical preparation consisting of the dehydrated pyrogen-free solution of claim 3.

5. An about neutral medical preparation consisting of a pyrogen-free aqueous solution of sodium-ferric beta-hydroxy-ethyl ethylene diamine tri-acetate having from ½ to 5% thereof of tri sodium beta hydroxy ethyl ethylene diamine tri-acetate.

6. An about neutral medical preparation consisting of the dehydrated pyrogen-free solution of claim 5.

7. A composition comprising sodium-iron beta-hydroxyethyl ethylene diamine triacetate, said composition being about neutral electrically.

References Cited in the file of this patent

UNITED STATES PATENTS 2,811,550    Young  _____ Oct. 29, 1957

OTHER REFERENCES

Chaberek et al.: "Science," vol. 118, September 4, 1953, p. 280.